(12) United States Patent
Sanchez et al.

(10) Patent No.: US 7,956,095 B2
(45) Date of Patent: Jun. 7, 2011

(54) EXTRUSION OF A THERMOPLASTIC POLYMER BEARING ACID IONIC GROUPINGS

(75) Inventors: Jean-Yves Sanchez, Saint Ismier (FR); Cristina Iojoiu, Grenoble (FR); Yves Piffard, La Chapell sur Erdre (FR); Nadia El Kissi, Grenoble (FR); France Chabert, Paris (FR)

(73) Assignees: Institut National Polytechnique de Grenoble, Grenoble (FR); Eras-Labo, Saint Nazaire-les-Eymes; Commissariat a l'Energie Atomique, Paris (FR); Centre National de la Recherche Scientifique, Paris (FR)

( * ) Notice: Subject to any disclaimer, the term of this patent is extended or adjusted under 35 U.S.C. 154(b) by 541 days.

(21) Appl. No.: 11/886,466

(22) PCT Filed: Mar. 9, 2006

(86) PCT No.: PCT/FR2006/000526
§ 371 (c)(1),
(2), (4) Date: Sep. 17, 2008

(87) PCT Pub. No.: WO2006/097603
PCT Pub. Date: Sep. 21, 2006

(65) Prior Publication Data
US 2009/0131544 A1      May 21, 2009

(30) Foreign Application Priority Data
Mar. 16, 2005  (FR) ..................................... 05 02602

(51) Int. Cl.
*C08J 5/20*          (2006.01)
(52) U.S. Cl. ................. 521/27; 521/28; 521/33; 521/37; 429/492; 429/493; 210/500.41

(58) Field of Classification Search .................... 521/25, 521/26, 27, 28, 30, 33, 37; 429/400, 465, 429/478, 483, 485, 491, 492, 493; 210/500.21, 210/500.23, 500.27, 500.28, 500.4; 264/48; 525/410, 424, 430, 495, 496
See application file for complete search history.

(56) References Cited

U.S. PATENT DOCUMENTS

| | | | |
|---|---|---|---|
| 3,341,366 A | 9/1967 | Hodgdon, Jr. et al. | |
| 4,711,907 A | 12/1987 | Sterzel et al. | |
| 4,721,771 A * | 1/1988 | Jansons et al. | 528/222 |
| 2003/0187081 A1 | 10/2003 | Cui | |
| 2006/0102869 A1 | 5/2006 | Cavaille et al. | |

FOREIGN PATENT DOCUMENTS

| | | |
|---|---|---|
| EP | 1 380 619 | 1/2004 |
| FR | 2 841 255 | 12/2003 |
| WO | WO 02/092673 | 11/2002 |

OTHER PUBLICATIONS

P. Genova-Dimitrova, B. Baradie, D. Foscallo, C. Poinsignon and J. Y. Sanchez Ionomeric membranes for proton exchange membrane fuel cell (PEMFC): sulfonated polysulfone associated with phosphatoantimonic acid, Journal of Membrane Science 2001, 185, 59-71.*
International Search Report, International Application No. PCT/FR2006/000526, dated Mar. 8, 2006.

* cited by examiner

*Primary Examiner* — James Seidleck
*Assistant Examiner* — Frances Tischler
(74) *Attorney, Agent, or Firm* — Merchant & Gould

(57) ABSTRACT

The invention relates to a process for the extrusion of thermoplastic polymers having acid ionic groups.

The process consists in preparing a mixture composed of a thermoplastic polymer having acid ionic groups and a plasticizer, in extruding the mixture obtained to form a film, then in washing the film obtained in aqueous medium to remove said plasticizer(s). The plasticizer is chosen from non-volatile compounds which are stable with respect to the ionic groups of the polymer, which are soluble in water or in solvents that are miscible with water, said plasticizers being chosen from the compounds that react with the ionic group of the polymer via formation of a weak bond of the hydrogen bond-type, and the compounds that react with the ionic group of the polymer via formation of a strong bond, of the ionic bond-type.

12 Claims, 9 Drawing Sheets

EXTRUSION OF A THERMOPLASTIC POLYMER BEARING ACID IONIC GROUPINGS

The present invention relates to a process for preparing membranes composed of a thermoplastic polymer bearing acid ionic groups.

BACKGROUND OF THE INVENTION

It is known that polymers bearing ionic groups may be used for producing membranes for fuel cells. The ionic groups may be acid groups or alkaline groups.

It is also known how to prepare polymer films either by casting from a solution of the polymer in a volatile solvent, or by extrusion. Extrusion is advantageous, since it makes it possible to avoid the use of volatile solvents, which may be flammable.

A polymer may be extruded on condition that it has a thermal stability such that the polymer is not degraded at the temperature required for the extrusion, which depends on the glass transition temperature.

The comparison of the thermal stability of a polymer having a given backbone that does not bear ionic groups with the thermal stability of a polymer which has the same backbone but which bears ionic groups shows that the polymer with ionic groups has a lower thermal stability. The degradation temperature is therefore lower and it is generally incompatible with the temperature required for extrusion, which depends on the glass transition temperature.

It is known to lower the glass transition temperature of a polymer by mixing it with a plasticizer, to enable extrusion without thermal degradation, the plasticizer then being removed after extrusion. The polymers that have been extruded by this process are polymers which do not bear ionic groups. As plasticizers used for the extrusion of thermoplastic polymers, mention may be made of chlorinated or non-chlorinated paraffins, carboxylic esters (such as adipates, benzoates, citrates and phthalates), phosphoric esters, and toluene disulfonamides. For example, H. H. Kausch, et al., (Traité des Matéeriaux (Materials Compendium), volume 14, Presses Polytechniques et Universitaires Romandes, Lausanne, 2001) describe the extrusion of polystyrene after incorporating organic agents as plasticizer.

The inventors have then envisaged preparing films of polymers bearing acid ionic groups by subjecting a polymer and plasticizer mixture to extrusion, then by removing the plasticizer from the film obtained by extrusion. However, it has turned out that, among the many compounds known as plasticizers for extruding polymers without ionic groups, all were unable to be used with a polymer having acid groups. For example, the paraffins had little affinity for the ionic groups. In addition, in the presence of small amounts of moisture, the carboxylic esters and the phosphoric esters are degraded by the acid ionic groups of the polymer to be extruded.

The work of the inventors has thus enabled them to define a family of compounds that can be used as plasticizers for polymers bearing acid ionic groups, said plasticizers lowering the glass transition temperature and allowing an extrusion temperature that remains below the degradation temperature of the polymer.

SUMMARY OF THE INVENTION

The subject of the present invention is consequently a process for preparing a membrane by extruding a thermoplastic polymer bearing acid ionic groups, and also the membranes obtained.

The process according to the invention consists in preparing a mixture composed of at least one plasticizer and one polymer having acid ionic groups $-A^{p-}(H^+)_p$ in which A represents the anionic part of the ionic group, and p is the valency of the anionic group, in extruding the mixture obtained to form a film, then in washing the film obtained in aqueous medium to remove said plasticizer(s). It is characterized in that the plasticizer(s) is (are) chosen from non-volatile compounds which are stable with respect to the ionic groups of the polymer, which are soluble in water or in solvents that are miscible with water, said plasticizers being chosen from:

the compounds that react with the ionic group of the polymer via formation of a weak bond of the hydrogen bond-type, chosen from the group composed of sulfamide $H_2N-SO_2-NH_2$, tetraalkylsulfamides, alkylsulfonamides, and arylsulfonamides $R^3-SO_2-NH_2$ in which $R^3$ is a phenyl group, a tolyl group or a naphthyl group; and the compounds that react with the ionic group of the polymer by formation of a strong bond, of the ionic bond-type.

BRIEF DESCRIPTION OF THE DRAWINGS

FIG. 5 shows that the glass transition temperature is 196° C. (inflexion point on the curve of the reversible signal).

FIG. 8 shows the behavior of the mixture at 160° C. (squares) and at 180° C. (lozenges).

FIG. 11 shows the behavior of the mixture.

FIG. 12 shows the behavior of the mixture.

DETAILED DESCRIPTION OF THE PREFERRED EMBODIMENTS

Figure 1:
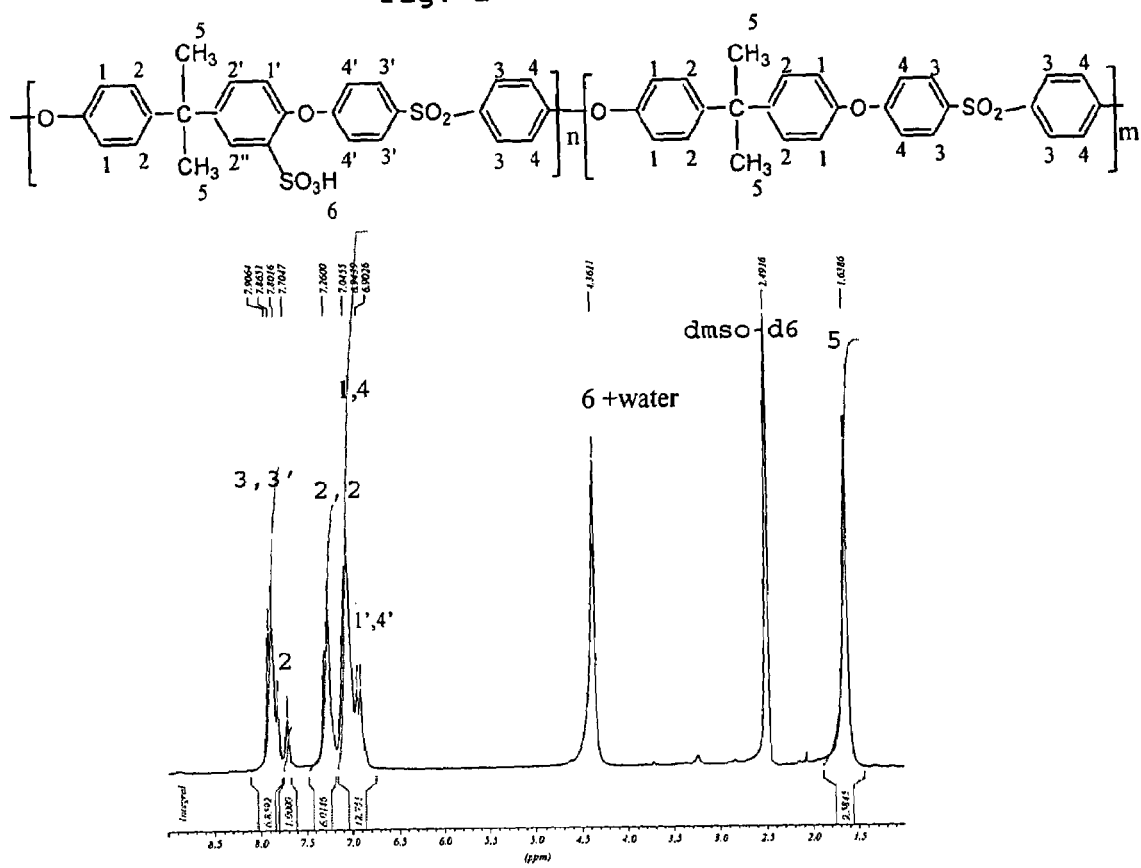
FIG. 1 shows the $^1H$ NMR spectrum of the sulfonated polysulfone prepared in Example 1.

The aqueous medium used for washing the film obtained after extrusion is composed of water, a solvent that is miscible with water in which the plasticizer is soluble, or a mixture of such a solvent with water.

The expression "non-volatile compound" is understood to mean a compound of which the boiling point temperature is above the maximum extrusion temperature of the polymer with which it is combined. This temperature is generally above 200° C.

The affinity for the $H^+$ cation and the affinity for the anionic part of the ionic groups may be evaluated respectively by the donor nature or the accepter nature defined in the "Donor Number" and "Accepter Number" scales defined by Gutman, and published in C. Reichardt, "Solvents and solvent effects in organic chemistry", $2^{nd}$ Edition, VCH, 1990.

The process proposed may be used for producing membranes from a thermoplastic polymer whose chain is composed of identical or different repeating units, each repeating unit comprising at least one functional group and at least one mononuclear or polynuclear aromatic group, the functional group being chosen from ester, ketone, ether, sulfide, sulfone, benzoxazole, amide and imide groups, at least some of the aromatic groups bearing an acid ionic group. The functional group may make up part of the main chain of the polymer, and consequently be found between two aromatic groups. The functional group may also make up part of a side substituent of an aromatic group, said aromatic group making up part of the main chain of the polymer.

The ionic group $-A^{p-}(H^+)_p$ may be chosen from all the ionic groups sufficiently dissociated in the reaction medium. By way of example, mention may be made of the $—O^-H^+$ group, sulfonate $—SO_3^-H^+$ group, sulfate $—OSO_3^-H^+$ group, carboxylate $—CO_2^-H^+$ group, thiocarboxylate $—C(=S)O^-H^+$ group, dithiocarboxylate $—CS_2^-H^+$ group, phosphonate $—PO_3^{2-}(H^+)_2$ group, sulfonylamide $—SO_2NH^-H^+$ group and sulfonylimide $(X—SO_2NSO_2—)^-H^+$ groups in which X is an alkyl group preferably having from 1 to 5 carbon atoms, a perfluorinated or partially fluorinated alkyl group preferably having from 1 to 5 carbon atoms, an alkenyl group preferably having from 1 to 5 carbon atoms, a perfluorinated or partially fluorinated alkenyl group preferably having from 1 to 5 carbon atoms, an oxyalkylene $CH_3—(O—(CH_2)_m)_n$ group in which preferably $2 \leq m \leq 5$ and $1 \leq n \leq 10$, or an aryl group comprising one or more fused or unfused aromatic rings and optionally bearing a substituent. The process is particularly advantageous for polymers in which the content of ionic groups is greater than or equal to 1 mol/kg of polymer.

As examples of thermoplastic polymers, mention may be made of the polymers which comprise segments chosen from the following segments in which the functional group $-A^{p-}(H^+)_p$ represents any of the above ionic groups, and the indices n, m, x and y each represent a number of repeating units:

a polyether of which certain repeating units bear an acid ionic group, for example a polyphenylene oxide corresponding to the formula I, in which R and $R_1$ represent, independently of one another, H, an alkyl group preferably having from 1 to 5 carbon atoms, an alkenyl group preferably having from 2 to 5 carbon atoms, or an aryl group:

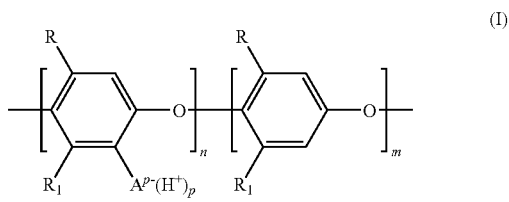

(I)

a polyetheretherketone which is composed of units comprising ether functions and ketone functions in the chain, and of which certain units bear an acid ionic group, for example a polyether corresponding to the formula II below:

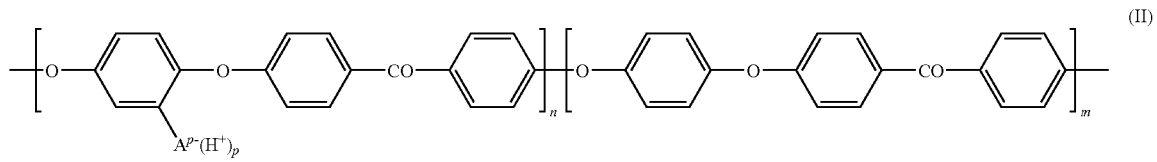

(II)

a polyetherketone which is composed of units comprising ether functions and ketone functions in the chain, and of which certain units bear an acid ionic group, for example a polyether corresponding to the formula III below:

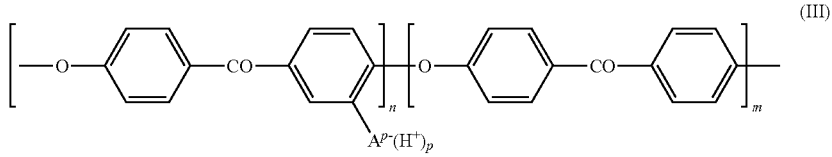

(III)

a polybenzoxazole of which certain units bear an acid ionic group, for example a polymer whose repeating unit corresponds to the formula IV below:

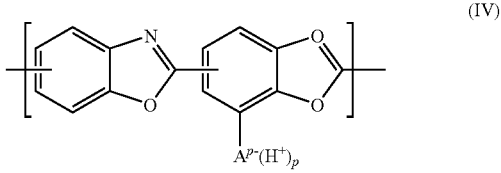

(IV)

a polyamic acid of which certain units bear an acid ionic group, and which is converted to a polyimide by the heat of extrusion, for example the following polyimide:

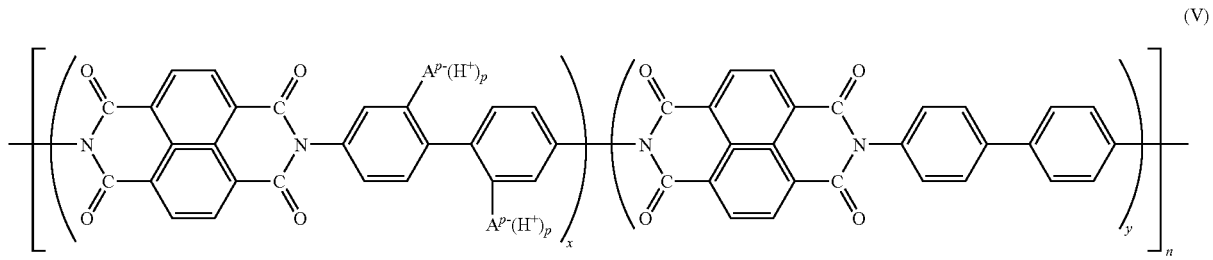

a polyimide corresponding to the formula V;
a polyparaphenylene, for example comprising units corresponding to the formula VI:

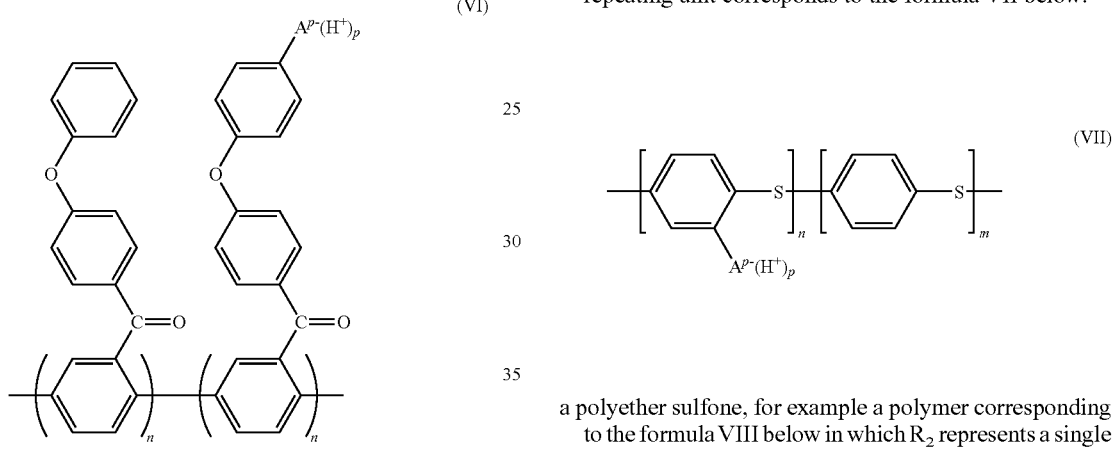

such as poly(4-phenoxybenzoyl-1,4-phenylene) sold by Maxdem Inc. under the name "POLY-X200";
a polyphenylene sulfide, for example a polymer whose repeating unit corresponds to the formula VII below:

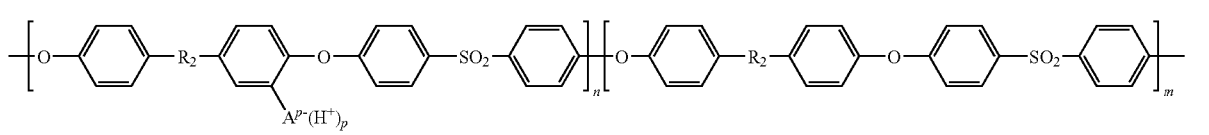

a polyether sulfone, for example a polymer corresponding to the formula VIII below in which $R_2$ represents a single bond or a —C(CH$_3$)— group:

One particular family of polymers is composed of polymers that comprise segments chosen from the segments below, in which the ionic group is —SO$_3$H. They are represented by the following formulae:

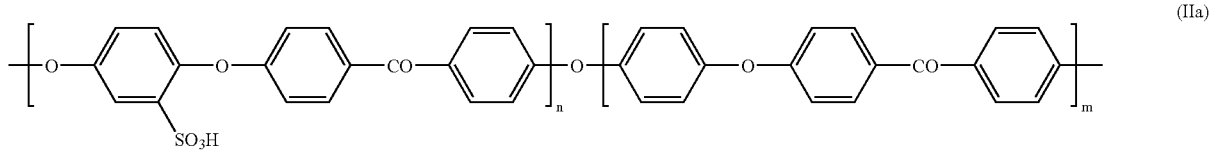

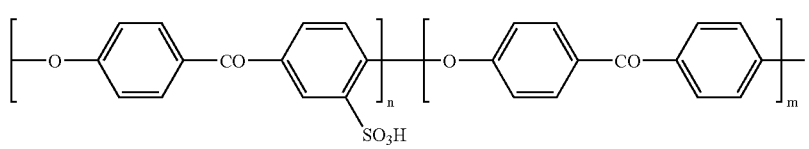

(IIIa)

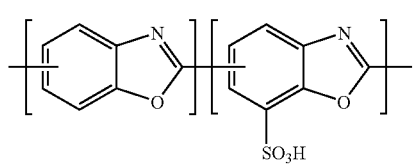

(IVa)

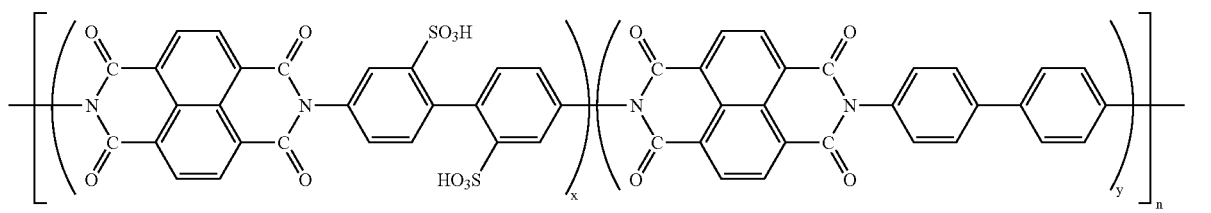

(Va)

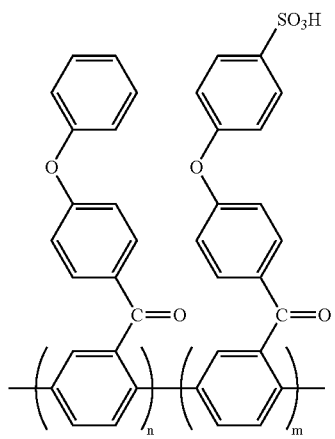

(VIa)

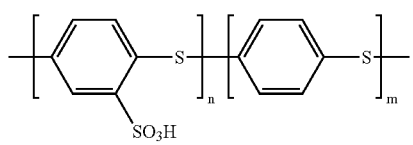

(VIIa)

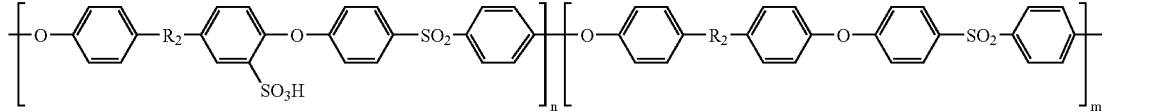

(VIIIa)

In the above formulae, the indices n, m, x and y each represent a number of repeating units and they are chosen so that the molecular weight of the polymer is preferably between 20,000 g/mol and 500,000 g/mol, and the ion exchange capacity IEC greater than 0.8 H$^+$/g.

Among the compounds that can be used as a plasticizer and that react with the ionic group of the polymer via formation of a weak bond of the hydrogen bond-type, mention may be made of sulfamide $H_2N-SO_2-NH_2$, tetraalkylsulfamides in which the alkyl groups preferably have from 1 to 5 carbon atoms (for example, tetraethylsulfamide), alkylsulfonamides in which the alkyl group preferably has from 1 to 5 carbon atoms and arylsulfonamides, $R_3-SO_2NH_2$ in which $R^3$ is, for example, a phenyl group, a tolyl group or a naphthyl group.

Among the compounds that can be used as a plasticizer and that react with the ionic group of the polymer via formation of a strong bond, of the ionic bond-type, mention may be made of:

imidazole, N-alkylimidazole, N-vinylimidazole;
ethylene oxide oligomers bearing a terminal primary amine or secondary amine group. Oligomers bearing a terminal primary amine group are sold under the name JEFFAMINE®. Oligomers that bear a terminal secondary amine group may be prepared by a process consisting in making an oligoether terminated by one or two alcohol functions react with thionyl chloride, the alcohol function(s) by chlorines, in treating the product obtained with an excess of piperazine and then in purifying the final product [Cf. X. Ollivrin, F. Alloin, J-F. Le Nest, D. Benrabah, J-Y. Sanchez, Electrochimica Acta, 48, 14-16, 1961-69 (2003)];

secondary amines, such as for example diethanolamine sold by Aldrich under the reference D8, 330-3) and bis(2-methoxyethyl)amine sold by Aldrich under the reference B4, 820-7; and tertiary amines bearing three oligo (oxyethylene) substituents.

A plasticizer of this type, which forms an ionic bond with the ionic groups of the polymer, fixes the proton of the acid group borne by the polymer giving a conjugated acid, of the ammonium or imidazolium type. Such a conjugated acid is a very weak acid which degrades neither the plasticizer nor the acid ionic polymer and which makes it possible to carry out the extrusion at higher temperatures.

The aforementioned compounds may be used as plasticizers alone, or with a compound that acts as a plasticizer for the backbone, the various compounds having to be miscible.

The mixture of ionic thermoplastic polymer and plasticizer subjected to the extrusion may contain, in addition, a filler which may be chosen from fillers intended to improve the mechanical strength of the polymer film obtained after extrusion, and fillers intended to improve other properties of the final material. The filler intended to improve the mechanical strength may be chosen from glass fibers, carbon fibers, carbon nanotubes and cellulose microfibrils, alumina fibers and polyaramid fibers, sold under the name "KEVLAR®". As the filler intended to improve the hydrophilicity of a polymer film obtained after extrusion, and consequently its conductivity, mention may be made of phosphatoantimonic acid (H3).

A polymer of the sulfonated polysulfone type corresponding to the formula (VIIIa)

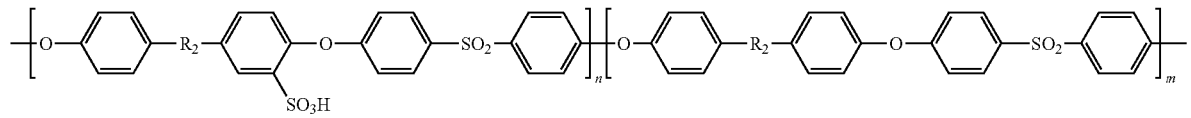

may be obtained from polymers sold by Solvay, respectively under the names UDEL® when $R_2$ represents a —C(CH$_3$)$_2$— group and RADEL® when $R_2$ represents a single bond. These UDEL® and RADEL® polymers have a similar structure to that of the polymers (VIII) above, but they do not bear any ionic groups. The process for preparing the polymer (VIII) from the UDEL or RADEL precursor polymer (VIIIp) comprises the following steps:

1. preparing an anhydrous solution of the polymer (VIIIp) in a solvent chosen from chlorinated organic solvents (for example, dichloroethane DCE, tetrachloroethane TCE or dichloromethane DCM) or chloroform;
2. preparing an anhydrous solution of trimethylsilyl chlorosulfonate, which is the sulfonation reactant;
3. bringing the two anhydrous solutions into contact, with vigorous stirring, for a duration of a few hours at a temperature between 30° C. and 65° C., under argon;
4. extracting the sulfonated polymer either directly by filtration, or by precipitation followed by filtration;
5. room-temperature evaporation of the precipitation solvent;
6. washing the sulfonated polymer with water; and
7. drying the sulfonated polymer under dynamic vacuum, at a temperature between 40° C. and 80° C., for example at 50° C.

The present invention is illustrated by the following examples.

EXAMPLES 1 and 2

Examples 1 and 2 relate to the preparation of sulfonated polysulfones bearing acid groups.

EXAMPLE 1

Preparation of a Sulfonated Polysulfone

During a first step, an anhydrous solution of UDEL® polymer was prepared by dissolving 1600 g (3.62 mol) of UDEL® polymer in 16 l of DCE at 50° C., then by drying the solution by azeotropic distillation until 1 l of DCE was removed.

At the same time, an anhydrous solution of trimethylsilyl chlorosulfonate was prepared by dissolving 472 g (4.34 mol) of trimethylsilane chloride and 422 g (3.6 mol) of ClSO$_3$H in 500 ml of dry DCE with magnetic stirring and under argon, all the constituents being anhydrous, for a duration of 2 h, the HCl formed being trapped.

During a second step, the two anhydrous solutions were mixed under an argon purge and the mixture was kept at 35° C. with vigorous stirring for 17 h.

During a third step, the solution was precipitated in petroleum ether, the precipitate formed was separated by filtration, and it was washed three times with petroleum ether, then the petroleum ether residue was evaporated under air at room temperature.

Finally, the precipitate was washed with distilled water to a neutral pH, it was dried in air at 20° C. for a duration of 24 h, then under a pressure of 20 mbar at 55° C. for a duration of 72 h.

The polymer obtained was subjected to a $^1$H NMR analysis, an infrared spectroscopy analysis and to an acid-based titration.

The degree of sulfonation, that is to say the ion-exchange capacity IEC, determined by these methods, was 0.56H$^+$/mol of repeating units, which corresponds to an ion-exchange capacity of 1.14 meq/g.

Figure 2:
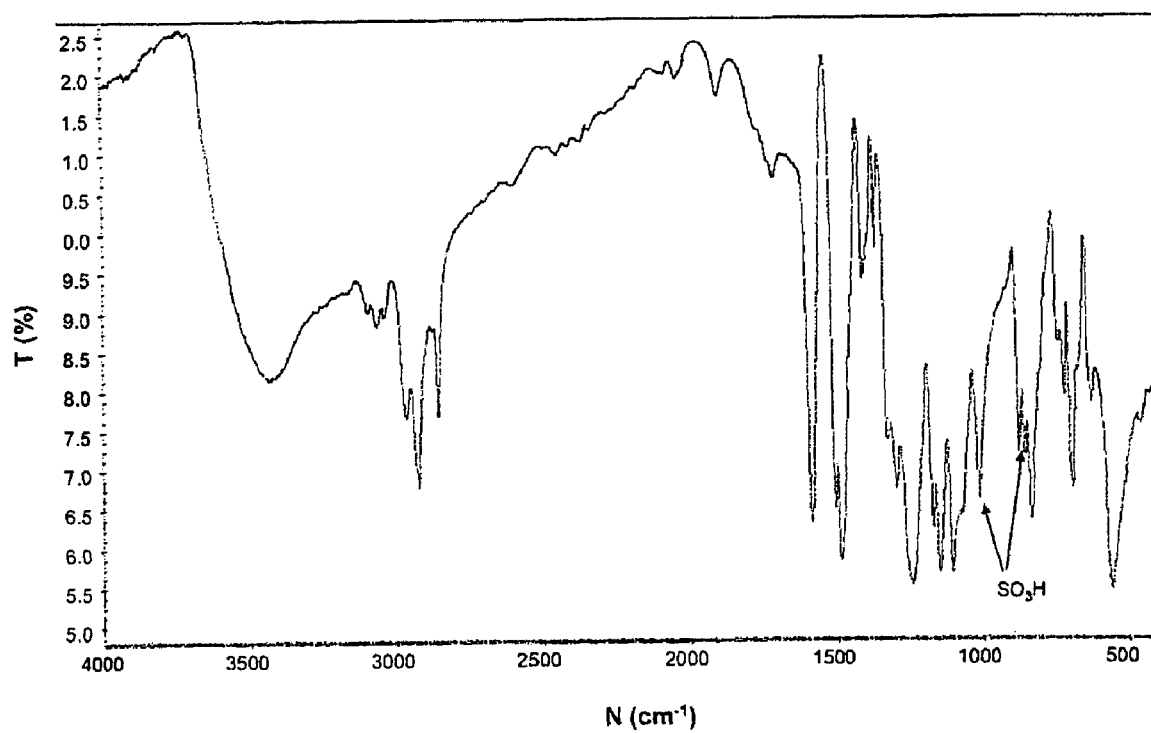
FIG. 2 shows the IR spectrum of the sulfonated polysulfone prepared in Example 1.

FIG. 1 shows the $^1$H NMR spectrum and FIG. 2 shows the IR spectrum. In FIG. 2, T represents the transmission and N the wavenumber.

EXAMPLE 2

Preparation of a Sulfonated Polysulfone

An anhydrous solution of UDEL® polymer was prepared by dissolving 1800 g (4.07 mol) of UDEL® polymer in 18 l of DCE at 50° C., then by drying the solution by azeotropic distillation until 1 l of DCE was removed.

At the same time, an anhydrous solution of trimethylsilyl chlorosulfonate was prepared by dissolving 743 g (6.84 mol)

of trimethylsilane chloride and 664 g (5.7 mol) of ClSO$_3$H in 700 ml of dry DCE with magnetic stirring and under argon, all the constituents being anhydrous, for a duration of 2 h, the HCl formed being trapped.

During a second step, the two anhydrous solutions were mixed under an argon purge and the mixture was kept at 35° C. with vigorous stirring for 17 h.

During a third step, the solution was precipitated in petroleum ether, the precipitate formed was separated by filtration, and it was washed three times with petroleum ether, then the petroleum ether residue was evaporated under air at room temperature.

Finally, the precipitate was washed with distilled water to a neutral pH, it was dried in air at 20° C. for a duration of 24 h, then under a pressure of 20 mbar at 55° C. for a duration of 72 h.

The polymer obtained was subjected to a $^1$H NMR analysis, an infrared spectroscopy analysis and to an acid-based titration.

The degree of sulfonation, that is to say the ion-exchange capacity IEC, determined by these methods, was 0.7H$^+$/mol of repeating units, which corresponds to an ion-exchange capacity of 1.4 meq/g.

Figure 3:
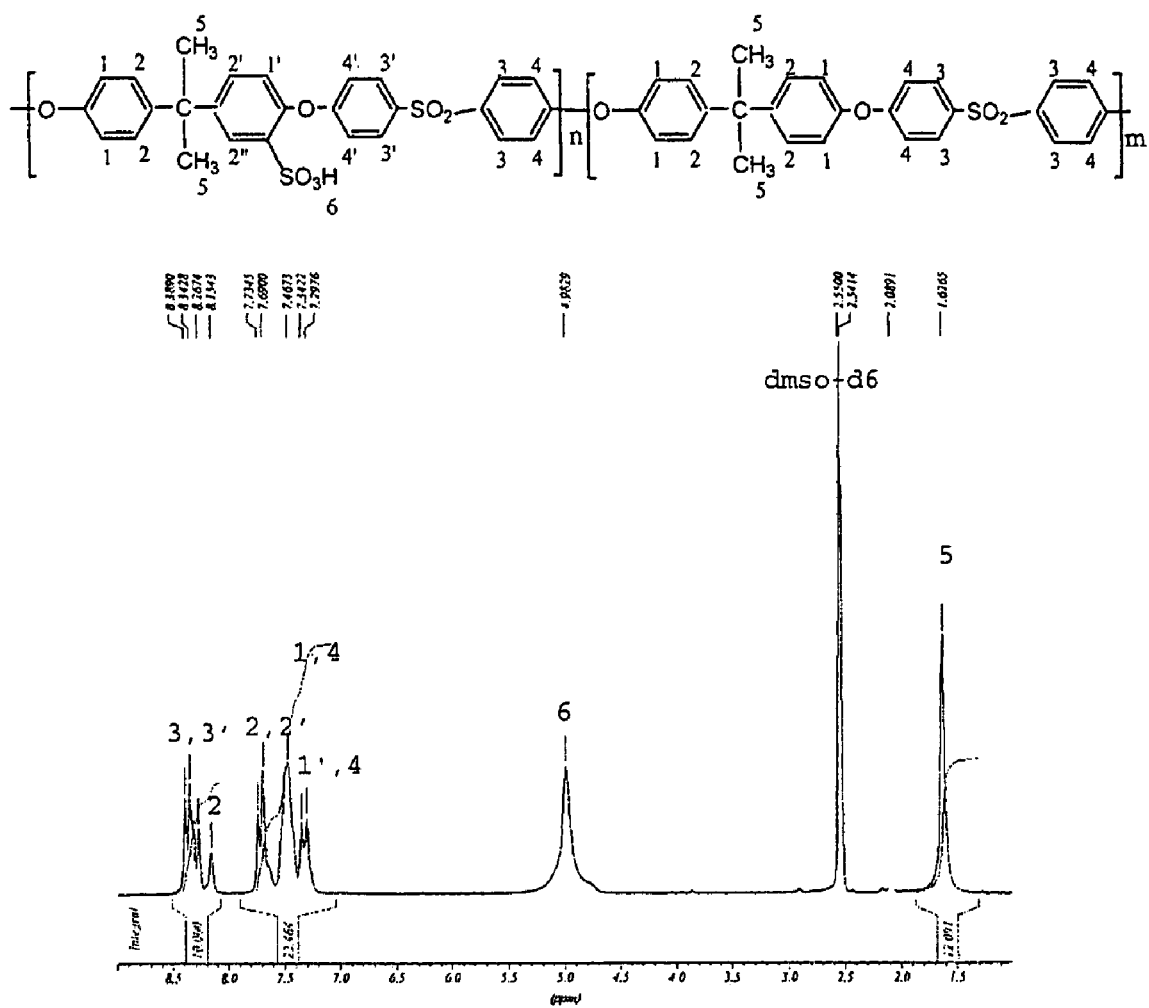
FIG. 3 shows the $^1H$ NMR spectrum of the sulfonated polysulfone prepared in Example 2.
Figure 4:
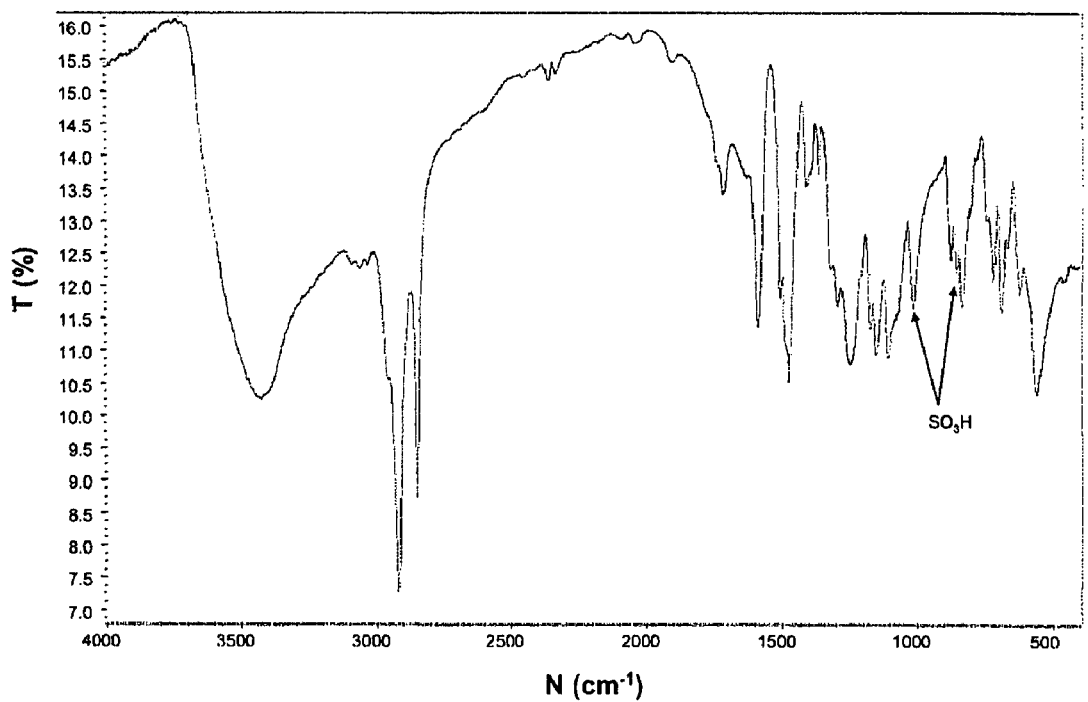
FIG. 4 shows the IR spectrum of the sulfonated polysulfone prepared in Example 2.

FIG. 3 shows the $^1$H NMR spectrum and FIG. 4 shows the IR spectrum. In FIG. 4, T represents the transmission and N the wavenumber.

Figure 5:
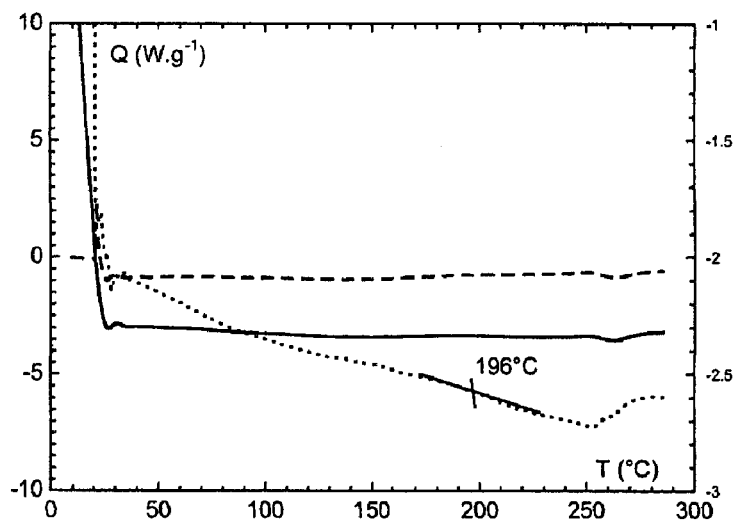
FIG. 5 shows the thermogram obtained by differential scanning calorimetryis of the sulfonated polysulfone prepared in Example 2.

The glass transition temperature of the sulfonated polysulfone was determined by differential scanning calorimetry, using a machine sold by TA Instruments under the name Modulated DSC 2920. The method of heating the sample separated the components of the total heat flow into a signal called a reversible signal and another signal called an irreversible signal. On the curve representing the reversible signal, the reversible thermal transitions such as the glass transition were observed. On the curve representing the irreversible signal, the irreversible thermal transitions such as melting or crystallization were observed. The thermogram obtained is shown in FIG. 5, in which the curve with the solid line represents the total heat flow, the curve with short dots represents the reversible signal and the curve with long dashes represents the irreversible signal.

The energy Q (in W/g of polysulfone) is represented on the y-axis and the temperature T on the x-axis. FIG. 5 shows that the glass transition temperature is 196° C. (inflexion point on the curve of the reversible signal).

EXAMPLES 3 to 7

Examples 3 to 7 demonstrate the extrudability of various compositions containing a sulfonated polysulfone and a plasticizer, and describe the production of membranes. They describe tests of dynamic rheometry and extrusions carried out with a Gottfert 1500 capillary rheometer. Dynamic rheometry, with the use of time-temperature equivalence, makes it possible to characterize the blends under the shear gradient conditions that they undergo in an extruder. The capillary rheometer, due to its handleability and moderate amounts of polymer consumed, is well suited to a study of extrudability. The data obtained by the two types of rheometry tests are representative of an extrusion in a single-screw or twin-screw extruder.

EXAMPLE 3

Sulfonated Polysulfone/Imidazole

This example was carried out using a fraction, known as PSUSH, of a polysulfone obtained according to the procedure from Example 2, and imidazole as a plasticizer. PSUSH denotes the product composed of particles having a size of less than 300 µm, obtained by milling the polysulfone obtained according to Example 2, then screening to a size of less than 300 µm. The mixture contained 27% by weight, namely 31% by volume of plasticizer.

Figure 6:
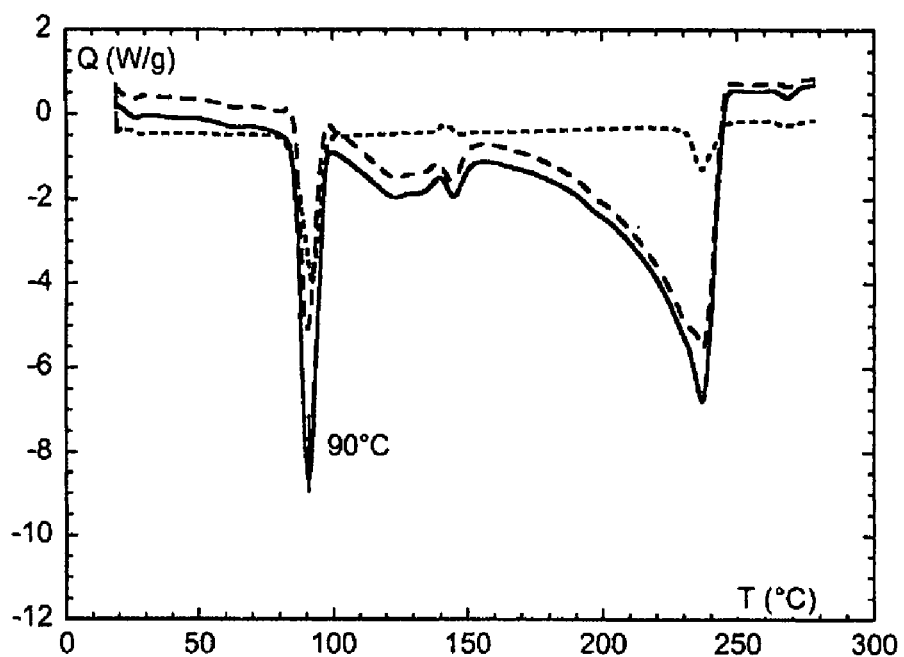
FIG. 6 represents the DSC thermogram of the imidazole plasticizer of Example 3.

The melting point of imidazole, determined by DSC, is 90° C., as shown in FIG. 6, which represents the DSC thermogram of imidazole. In FIG. 6, the curve with the solid line represents the total heat flow, the curve with short dots represents the reversible signal and the curve with long dashes represents the irreversible signal.

The PSUSH/imidazole mixture was produced in a Rheomix mixer from Haake comprising a 70 cm$^3$ chamber and 25 mm diameter counter-rotating rotors. The chamber was surmounted by a hopper via which the filling was carried out. The temperature of the mixer was set at 140° C. The rotational speed of the rotors was fixed at 80 rpm, which corresponded to an average shear of 80 s$^{-1}$.

PSUSH and imidazole were weighed separately to within 1 mg, then they were premixed by mechanical stirring before being poured into the hopper of the mixer. The rotors were activated for 20 minutes. The product obtained was a transparent liquid of light brown color, that was not very viscous at the temperature for producing the mixture, namely 140° C. At room temperature, the product became a solid, it was homogeneous to the naked eye.

Figure 7:
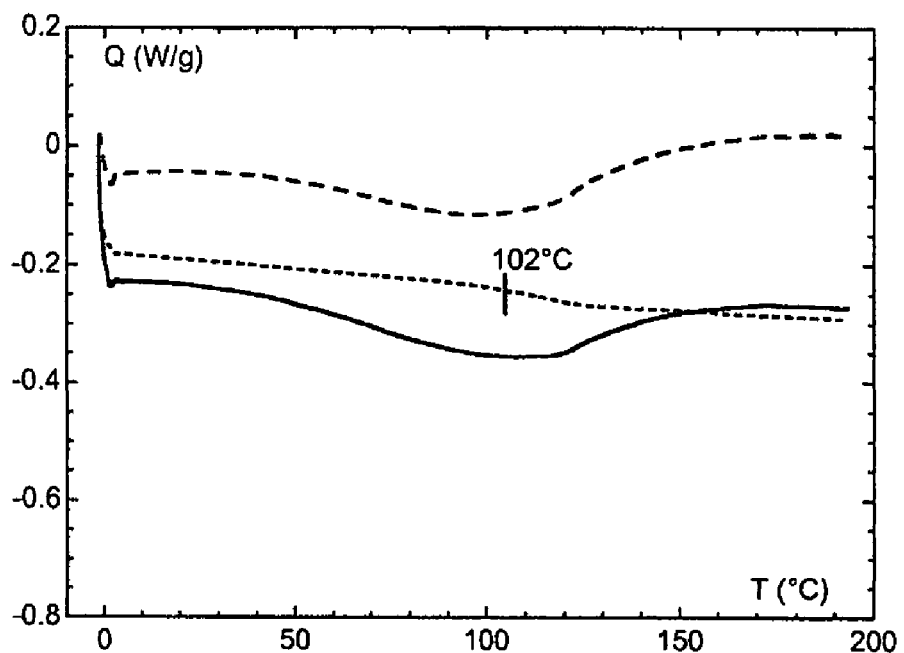
FIG. 7 represents the DSC thermogram of the PSUSH/imidazole mixture of Example 3.

The glass transition of the mixture was determined by DSC. FIG. 7 represents the DSC thermogram of the mixture, and it shows that the glass transition temperature was 102° C. The curve with the solid line represents the total heat flux, the curve with short dots represents the reversible signal and the curve with long dashes represents the irreversible signal.

The PSUSH/imidazole mixture was milled in a mechanical cutting mill (sold under the trademark IKA) equipped with a 2 mm sieve. The grains recovered after milling were placed in a ventilated oven at 60° C. for 4 hours to remove the water which would hamper the extrusion.

Figure 8:
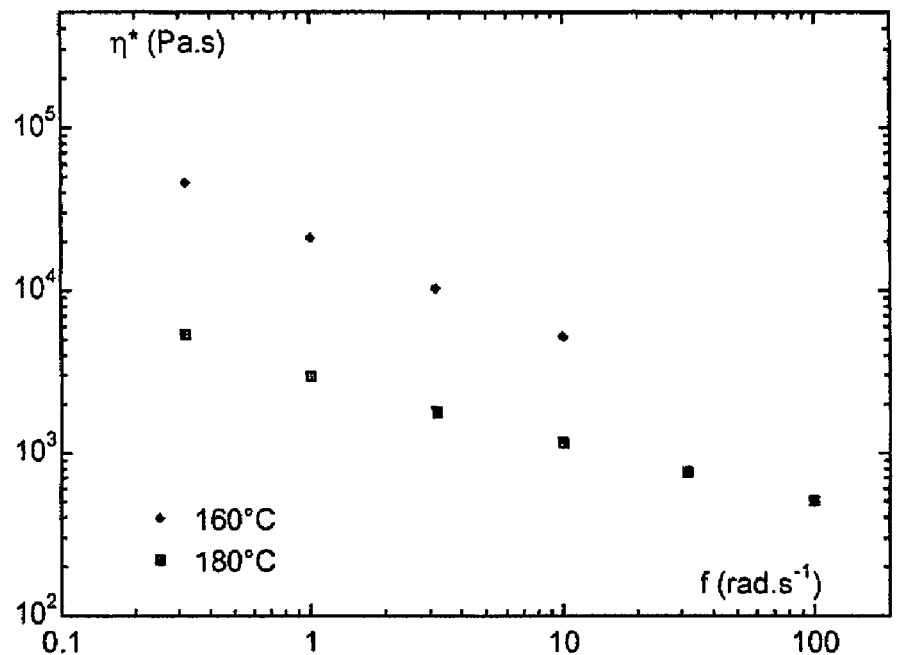
FIG. 8 shows that the viscosity of the PSUSH/imidazole mixture of Example 3 characterized in dynamic rheometry with an ARES rheometer from Rheometrics, at 160° C. and 180° C. and for shear gradients between $10^{-1}$ and $10^2$ $s^{-1}$.

The viscosity of the PSUSH/imidazole mixture was characterized in dynamic rheometry with an ARES rheometer from Rheometrics, at 160° C. and 180° C. and for shear gradients between 10$^{-1}$ and 10$^2$ s$^{-1}$. FIG. 8 shows the behavior of the mixture at 160° C. (squares) and at 180° C. (lozenges). On the y-axis, η* represents the viscosity, and on the x-axis, f represents the strain frequency of the sample.

FIG. 8 shows that the viscosity was 500 Pa·s at 100 s$^{-1}$ and at 180° C., and that the mixture could therefore be extruded.

A film was prepared by extruding a PSUSH/imidazole mixture using the Gottfert 1500 capillary rheometer. This rheometer comprised a heating reservoir into which the mixture was introduced. A piston pushed the molten mixture through a sheet die having a thickness of 0.8 mm. The extrusion temperature has to be above the glass transition temperature of the mixture so that the polymer flowed, but below the evaporation temperature of the plasticizer. The extrusion temperature chosen in the present case was 120° C. The thickness of the film on exiting the die was 0.8 mm, and drawing of the film allowed its thickness to be decreased to 0.1 mm.

The film was then cooled to room temperature. It was transparent and its surface did not have any defects.

The film was then submerged in water for 24 hours at room temperature to remove the plasticizer which dissolved in the water. An NMR analysis of the material after drying made it possible to check that the plasticizer had been completely removed. The membrane was then kept in water or in a moisture-saturated atmosphere.

The electrochemical results were obtained by impedance measurements by applying a low-amplitude sinusoidal voltage to an electrochemical cell, around its equilibrium voltage. The proton conductivity of the acid sulfonated polysulfone film, measured at 20° C. and 90% humidity was equal to 0.7 mS/cm.

EXAMPLE 4

Acid Sulfonated Polysulfone/Tetraethylsulfamide

This example was produced using the PSUSH polymer used in Example 3, and tetraethylsulfamide as a plasticizer. The mixture contained 26% by weight, namely 30% by volume, of plasticizer.

Figure 9:
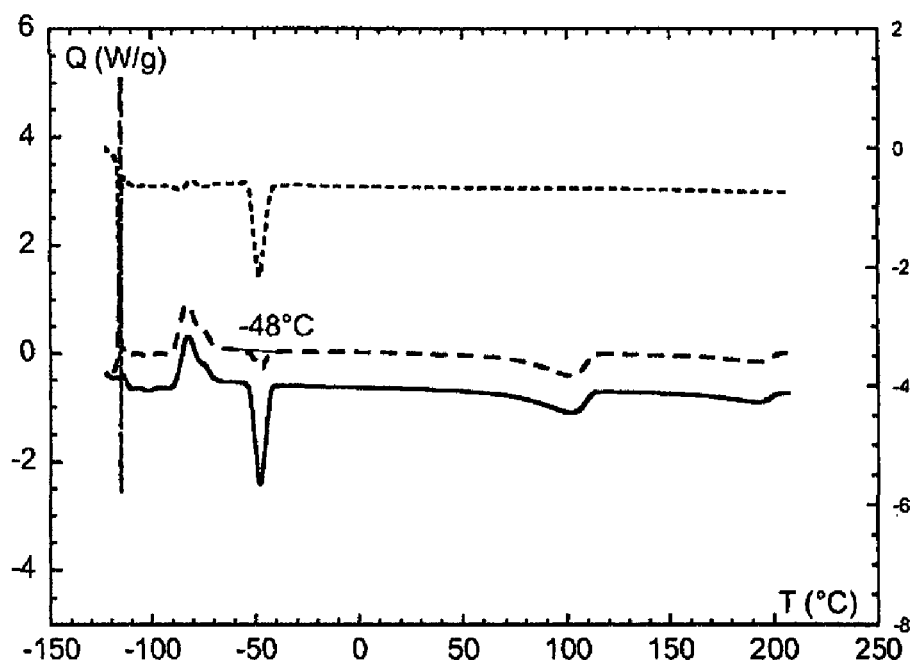
FIG. 9 shows the DSC thermogram of the tetraethylsulfamide plasticizer of Example 4.

The melting point of the tetraethylsulfamide, determined by DSC, was −48° C., as shown in FIG. 9, which represents the DSC thermogram of the tetraethylsulfamide. In FIG. 9, the curve with the solid line represents the total heat flow, the curve with short dots represents the reversible signal and the curve with long dashes represents the irreversible signal.

The PSUSH/tetraethyl sulfamide mixture was produced in a Rheomix mixer the same as that used in Example 3. The temperature of the mixer was set at 100° C. The rotational speed of the rotors was fixed at 80 rpm, which corresponded to an average shear of 80 $s^{-1}$.

PSUSH and tetraethylsulfamide were weighed separately to within 1 mg, then they were premixed by mechanical stirring before being poured into the hopper of the mixer. The rotors were activated for 20 minutes. The product obtained was a transparent liquid, of light brown color, that was not very viscous at the temperature for producing the mixture, namely 100° C. At room temperature, the product became a solid, it was homogeneous to the naked eye.

The glass transition of the mixture was 100° C., this assessment being made to assess it by slowly heating the mixture which became liquid around 100° C.

Figure 10:
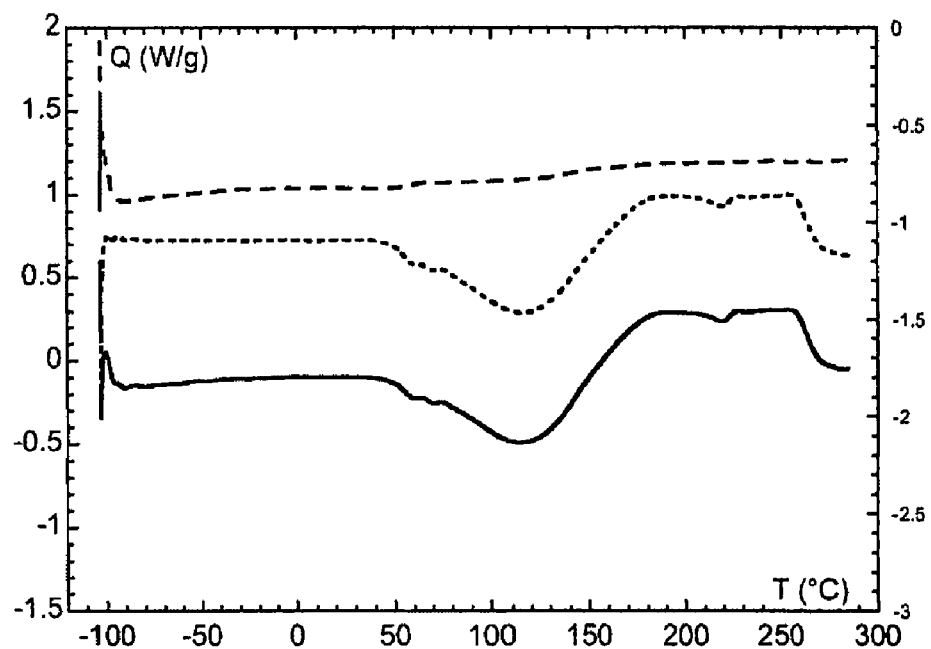
FIG. 10 shows the DSC thermogram of the PSUSH/tetraethyl sulfamide mixture of Example 4.

FIG. 10 shows the DSC thermogram of the mixture, and it is observed that the glass transition temperature was not visible therein. The curve with the solid line represents the total heat flow, the curve with short dots represents the reversible signal and the curve with long dashes represents the irreversible signal.

The PSUSH/tetraethylsulfamide mixture was milled in a mechanical cutting mill (sold under the trade mark IKA) equipped with a 2 mm sieve. The grains recovered after milling were placed in a ventilated oven at 80° C. for 4 hours to remove the water which would hamper the extrusion.

Figure 11:
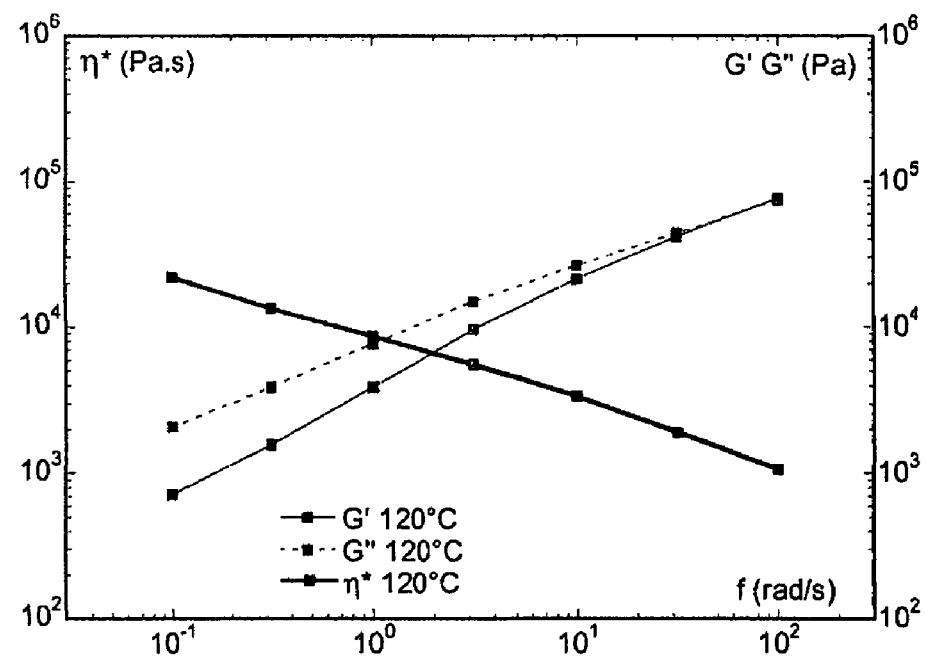
FIG. 11 shows that the viscosity of the PSUSH/tetraethylsulfamide mixture of Example 4 characterized in dynamic rheometry with an ARES rheometer from Rheometrics, at 120° C. and for shear gradients between $10^{-1}$ and $10^2$ $s^{-1}$.

The viscosity of the PSUSH/tetraethylsulfamide mixture was characterized in dynamic rheometry with an ARES rheometer from Rheometrics, at 120° C. and for shear gradients between $10^{-1}$ and $10^2$ $s^{-1}$. FIG. 11 shows the behavior of the mixture. The curve defined by circles connected by a thin solid line represents G", that is to say the elastic modulus. The curve defined by circles connected by a dotted line represents G", that is to say the viscous modulus. The curve defined by squares connected by a bold solid line represents the viscosity $\eta^*$. This figure shows that the viscosity was 1000 Pa·s at 100 $s^{-1}$ and at 120° C., and that the mixture could therefore be extruded.

A film was prepared by extruding a PSUSH/tetraethylsulfamide mixture using the Gottfert 1500 capillary rheometer, the same as that used in Example 3. The extrusion temperature chosen in the present case was 120° C. The thickness of the film exiting the die was 0.8 mm, and drawing the film made it possible to decrease its thickness to 0.1 mm.

The film was then cooled to room temperature. It was transparent and its surface did not have any defects.

The film was then submerged in water for 24 hours at room temperature to remove the plasticizer which dissolved in the water. An NMR analysis of the material after drying made it possible to verify that the plasticizer was completely removed. The membrane was then kept in water or in a moisture-saturated atmosphere.

The proton conductivity of the acid sulfonated polysulfone film, measured at 20° C. and 90% humidity, in the same way as in Example 3, was equal to 1.1 mS/cm.

EXAMPLE 5

Sulfonated Polysulfone/Tetraethylsulfamide/H3

This example was carried out using the PSUSH polymer used in Example 3, tetraethylsulfamide as a plasticizer, and phosphatoantimonic acid (H3) as a filler. The mixture contained 26% by weight, namely 30% by volume, of plasticizer. In the H3/PSUSH mixture (which represented 74% by weight or 70% by volume relative to the mixture of the three constituents), H3 represented 10% by volume relative to PSUSH.

The PSUSH/tetraethylsulfamide/H3 mixture was produced in a Rheomix mixer the same as that used in Example 3.

The temperature of the mixer was set at 100° C. The rotational speed of the rotors was fixed at 80 rpm, which corresponded to an average shear of 80 $s^{-1}$.

PSUSH, tetraethylsulfamide and H3 were weighed separately to within 1 mg, then they were premixed by mechanical stirring before being poured into the hopper of the mixer. The rotors were activated for 20 minutes. The product obtained was a transparent liquid, of yellow color that was not very viscous at the temperature for producing the mixture, namely 100° C. At room temperature, the product became a solid, it was homogeneous to the naked eye.

The PSUSH/tetraethylsulfamide/H3 mixture was milled in a mechanical cutting mill (sold under the trade mark IKA) equipped with a 2 mm sieve. The grains recovered after milling were placed in a ventilated oven at 80° C. for 4 hours to remove the water which would hamper the extrusion.

Figure 12:
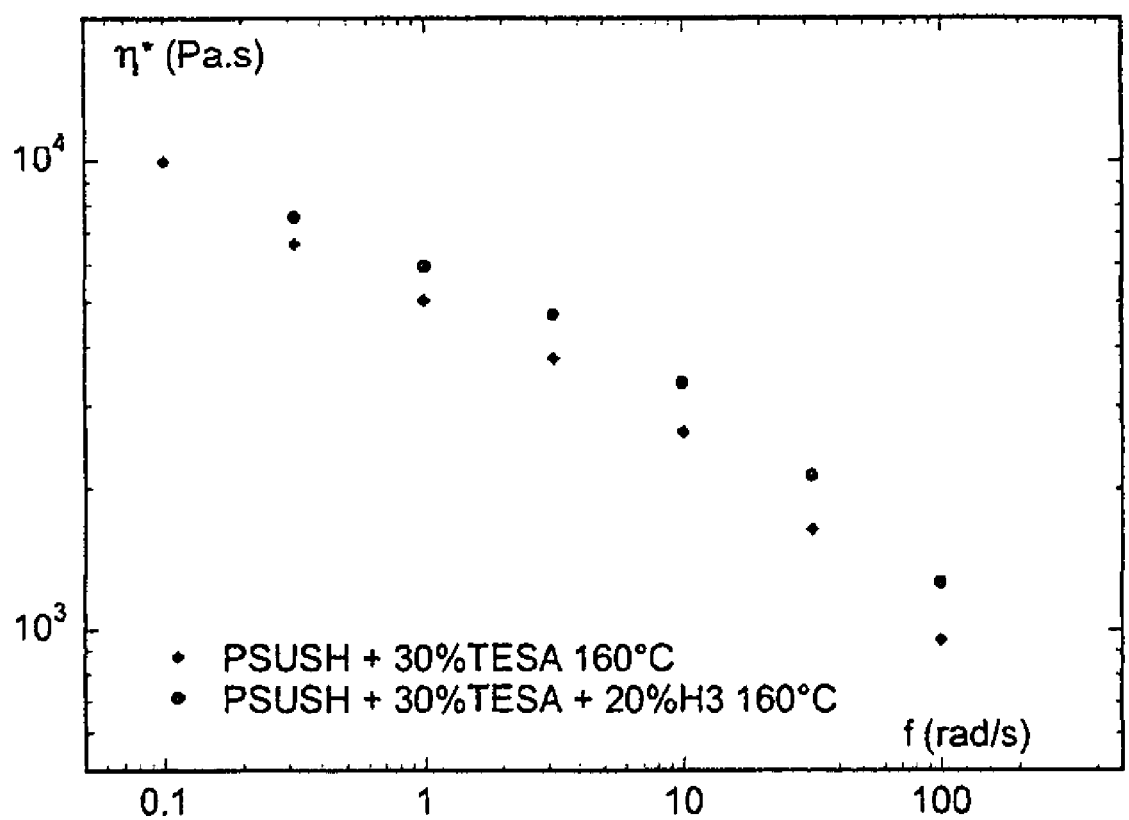
FIG. 12 shows that the viscosity of the PSUSH/tetraethylsulfamide/H3 mixture of Example 5 characterized in dynamic rheometry with an ARES rheometer from Rheometrics, at 160° C. and for shear gradients between $10^{-1}$ and $10^2$ $s^{-1}$.

The viscosity of the PSUSH/tetraethylsulfamide/H3 mixture was characterized in dynamic rheometry with an ARES rheometer from Rheometrics, at 160° C. and for shear gradients between $10^{-1}$ and $10^2$ $s^{-1}$. FIG. 12 shows the behavior of the mixture. The curve defined by circles represents the viscosity $\eta^*$ for the ternary mixture of the present example. The curve defined by circles corresponding to the binary mixture from Example 4. FIG. 12 shows that the viscosity was 1000 Pa·s at 100 $s^{-1}$ and at 160° C., and that it was little different from the viscosity of the binary mixture without H3, and that the ternary mixture of the present example could therefore be extruded.

A film was prepared by extruding a PSUSH/tetraethylsulfamide/H3 mixture using the Gottfert 1500 capillary rheometer, the same as that used in Example 3. The extrusion temperature chosen in the present case was 120° C. The thickness of the film exiting the die was 0.8 mm, and drawing the film made it possible to decrease its thickness to 0.1 mm.

The film was then cooled to room temperature. It was transparent and its surface did not have any defects.

The film was then submerged in water for 24 hours at room temperature to remove the plasticizer which dissolved in the water. An NMR analysis of the material after drying made it possible to verify that the plasticizer had been completely removed. The membrane was then kept in water or in a moisture-saturated atmosphere.

EXAMPLES 6 to 8

These examples relate to the extrusion of polymer/plasticizer mixtures the same as those from Examples 3 to 5, the extrusion being carried out using an extruder sold by DACA under the trademark Microcompounder.

Figure 13:
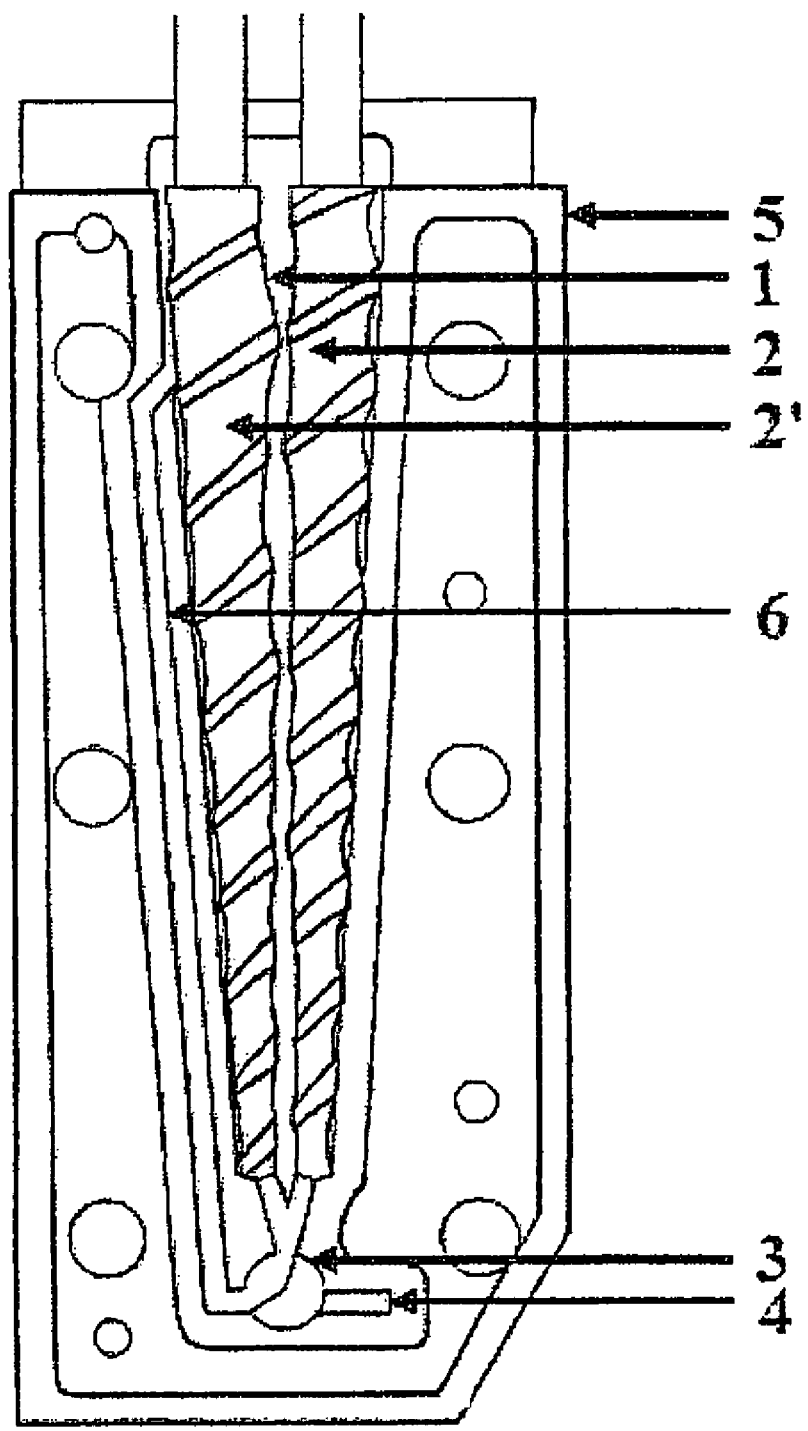
FIG. 13 shows a front view of one of the plates (5) of the extruder, used to extrude the polymer/plasticizer mixtures, as seen when the extruder is open for cleaning.

The body of the extruder is formed from two similar plates that were assembled together. FIG. 13 shows a front view of one of the plates (5) as seen when the extruder is open for cleaning. It comprises a barrel (1) in which two counter-rotating, conical screws (2, 2') are placed, heating cartridges (not shown) inserted into the two plates so as to maintain a homogeneous temperature in the barrel, a temperature sensor (not shown), a torque sensor (not shown), a two-way valve (3), an interchangeable die 4, and a channel (6) connecting the lower part of the barrel to the upper part.

The volume of the barrel (1) was 4.5 cm$^3$.

The 2 counter-rotating conical screws (2, 2') had a length of 100 mm and a maximum diameter of 10 mm. Their rotational speed could vary from 0 to 360 rpm. In the present example, the speed was 100 rpm, which represented an average shear of around 1500 s$^{-1}$, that is to say a shear representative of industrial extrusion conditions.

The two-way valve (3) could either be in "recycling" position, which enabled the material at the end of the screw to go back up to re-enter the barrel, or in "extrusion" position, in order to let the material exit through the die. In the figure, it is in the "recycling" position.

The interchangeable die (4) used in the present example was a 2 mm diameter axisymmetric die. In the Microcompounder extruder, the extrusion was carried out under the following conditions. The plates of the extruder were set at a given temperature Te. The mixture to be extruded was placed into a feed hopper, and pushed into the barrel with a piston. Inside the barrel, the two co-rotating screws mixed and melted the material, and forced it to the bottom. When the material reached the bottom of the barrel, it went back up via the outer channel (6) then re-entered the barrel to be mixed. This process could be repeated several times, for a duration Dex. The temperature of the polymer/plasticizer mixture was measured in real time by the temperature sensor. A torque sensor (not shown) measured the resistance Re created by the material during the rotation of the screws, in the range of 0 to 5N.m. At the end of the mixing process the valve was turned to the extrusion position, in order to let the material exit through the die (4).

EXAMPLE 6

Sulfonated Polysulfone/Imidazole

This example was carried out using a PSUSH/imidazole mixture prepared in the same way as in Example 3, but with an imidazole/PSUSH weight ratio of 27/73.

The extrusion was carried out with 3.20 g of mixture, with a plate temperature Te of 160° C., and a duration Dex of 5 min.

The temperature of the PSUSH/imidazole mixture, measured in real time by the temperature sensor, remained constant at 160° C., which signified that the mixture was not overheated. The torque measured was 3.8 N.m, which is to say that the material had a high viscosity at 160° C. At the end of the mixing process, the valve was turned to the extrusion position, in order to let the material exit through the die. The extrudate obtained was smooth and flexible at room temperature.

EXAMPLE 7

Sulfonated Polysulfone/Tetraethylsulfamide

This example was carried out using a PSUSH/tetraethylsulfamide mixture prepared in the same way as in Example 4, but with a tetraethylsulfamide/PSUSH weight ratio of 26/74.

The extrusion was carried out with 5.4 g of mixture, with a plate temperature Te of 130° C., and a duration Dex of 5 min.

The temperature of the PSUSH/tetraethylsulfamide mixture, measured in real time by the temperature sensor, remained at 130° C., which signified that the mixture was not overheated. The torque measured was 2.7 N.m, which is to say that the material flowed easily. At the end of the mixing process, the valve was turned into the extrusion position, in order to let the material exit through the die. The extrudate obtained was smooth and flexible at room temperature.

EXAMPLE 8

Sulfonated Polysulfone/Tetraethylsulfamide/H3

This example was produced using a PSUSH/tetraethylsulfamide/H3 mixture prepared in the same way as in Example 5. The mixture contained 26% by weight, namely 30% by volume, of plasticizer. In the H3/PSUSH mixture (which represented 74% by weight or 70% by volume relative to the mixture of the three constituents), H3 represented 10% by volume relative to PSUSH.

The extrusion was carried out with 2.90 g of mixture, under the following conditions with a plate temperature Te of 160° C. and a duration Dex of 5 min.

The temperature of the PSUSH/tetraethylsulfamide/H3 mixture, measured in real time by the temperature sensor, remained at 160° C., which signified that the mixture was not overheated. The torque measured was 4N.m, which is to say that the material had a high viscosity at 160° C. At the end of the mixing process, the valve was turned to the extrusion position, in order to let the material exit through the die. The extrudate obtained was smooth and flexible at room temperature.

The invention claimed is:

1. A process for preparing a membrane by extrusion of a thermoplastic polymer bearing acid ionic groups corresponding to the formula $-A^{p-}(H^+)_p$, in which A represents the anionic part of the ionic group and p represents the valency of the anionic group, comprising (a) preparing a mixture composed of a polymer having the acid ionic groups corresponding to the formula $-A^{p-}(H^+)_p$ and of at least one plasticizer, (b) extruding the mixture obtained to form a film, and (c) washing the film obtained in aqueous medium to remove said plasticizer(s), wherein the plasticizer(s) is (are) chosen from non-volatile compounds which are stable with respect to the ionic groups of the polymer, which are soluble in water or in solvents that are miscible with water, said plasticizers being chosen from:
   compounds that react with the ionic group of the polymer via formation of a weak hydrogen bond, selected from the group consisting of sulfamide $H_2N-SO_2-NH_2$, tetraalkylsulfamides, alkylsulfonamides, and arylsulfonamides $R^3-SO_2-NH_2$ in which $R^3$ is a phenyl group, a tolyl group or a naphthyl group; and
   compounds that react with the ionic group of the polymer by formation of a strong ionic bond, selected from the group consisting of:
   imidazole, N-alkylimidazole, N-vinylimidazole;
   ethylene oxide oligomers bearing a terminal primary amine group or a terminal secondary amine group;
   secondary amines; and
   tertiary amines bearing three ethylene oxide oligomer substituents.

2. The process as claimed in claim 1, wherein the aqueous medium used for washing the film obtained after extrusion is composed of water, a solvent that is miscible with water in which the plasticizer is soluble, or a mixture of such a solvent with water.

3. The process as claimed in claim 1, wherein the thermoplastic polymer is a polymer whose chain is composed of identical or different repeating units, each repeating unit comprising at least one functional group and at least one mononuclear or polynuclear aromatic group, the functional group being selected from the group consisting of ester, ketone, ether, sulfide, sulfone, benzoxazole, amino acid and imide groups, at least some of the aromatic groups bearing an acid ionic group.

4. The process as claimed in claim 3, wherein the functional group makes up part of the main chain of the polymer.

5. The process as claimed in claim 3, wherein the functional group makes up part of a side substituent of an aromatic group, said aromatic group making up part of the main chain of the polymer.

6. The process as claimed in claim 1, wherein the ionic $-A^{p-}(H^+)_p$ group of the polymer is selected from the group consisting of sulfonate $-SO_3^-H^+$, carboxylate $-CO_2H^+$, thiocarboxylate $-C(=S)O^-H^+$, dithiocarboxylate $-CS_2^-H^+$, phosphonate $-PO_3^{2-}(H^+)_2$, sulfonylamide $-SO_2NH^-H^+$, and sulfonylimide $(X-SO_2NHSO_2-)^-H^+$ groups, X being an alkyl group, a perfluorinated or partially fluorinated alkyl group or an aryl group.

7. The process as claimed in claim 1, wherein the polymer is chosen from the polymers which comprise segments chosen from the following segments in which the indices n, m, x and y each represent a number of repeating units:

a polyphenylene oxide corresponding to the formula I,

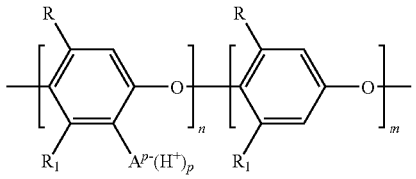

in which R and $R_1$ represent independently of one another H, an alkyl group, an alkenyl group, or an aryl group, n and m each represent a number of repeating units;

a polyetheretherketone corresponding to the formula II below

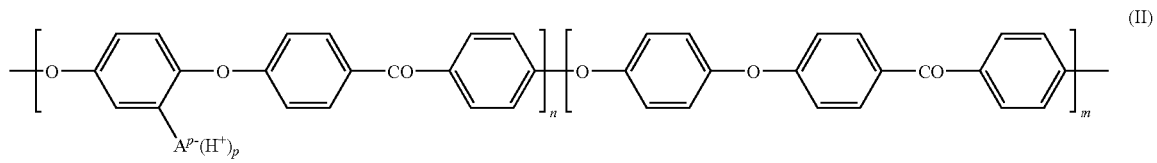

a polyetherketone corresponding to the formula III below:

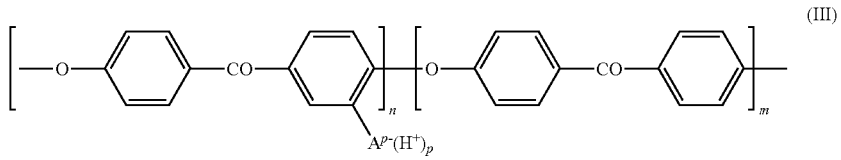

a polybenzoxazole whose repeating unit corresponds to the formula IV below:

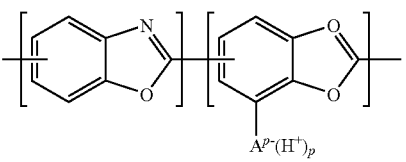

a polyamic acid of which certain units bear an acid ionic group, and which is converted to a polyimide corresponding to the formula below:

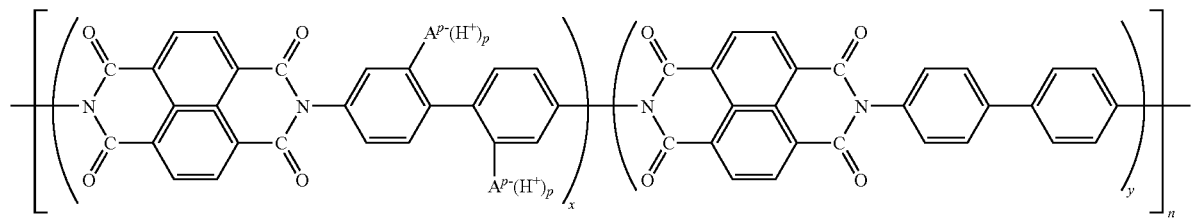

a polyparaphenylene corresponding to the formula VI:

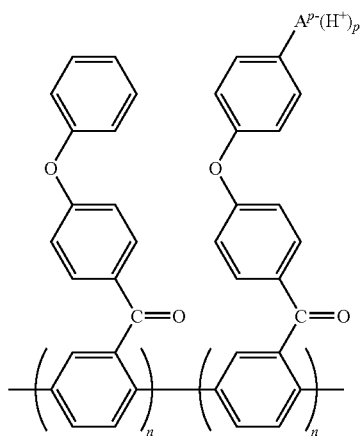

a polyphenylene sulfide that corresponds to the formula VII below:

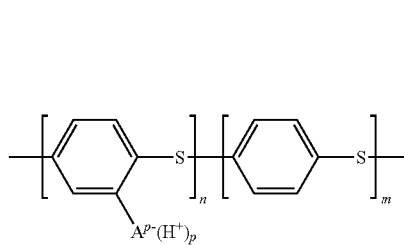

a polyether sulfide corresponding to the formula VIII:

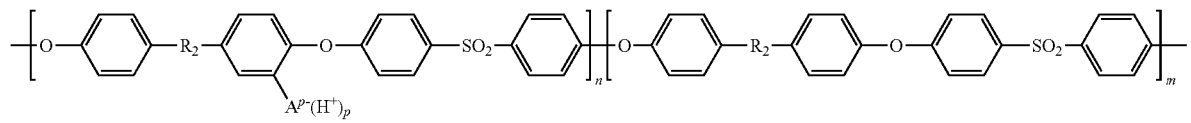

in which $R_2$ represents a single bond or a —C(CH$_3$)— group.

8. The process as claimed in claim 1, wherein the mixture of ionic thermoplastic polymer and plasticizer subjected to the extrusion further contains a filler.

9. The process as claimed in claim 8, wherein the filler is a filler intended to improve the mechanical strength.

10. The process as claimed in claim 9, wherein the filler is selected from the group consisting of glass fibers, carbon fibers, carbon nanotubes, cellulose microfibrils, alumina fibers and polyaramid fibers.

11. The process as claimed in claim 8, wherein the filler is a filler intended to improve the hydrophilicity of a film obtained after extrusion of the polymer.

12. The process as claimed in claim 11, wherein the filler is phosphatoantimonic acid.

* * * * *